United States Patent
Tserkovnyuk et al.

(10) Patent No.: US 6,950,121 B2
(45) Date of Patent: Sep. 27, 2005

(54) 3D CAMERA

(75) Inventors: Walter V. Tserkovnyuk, Yonkers, NY (US); Adam W. Divelbiss, Wappingers Falls, NY (US)

(73) Assignee: Vrex, Inc., Elmsford, NY (US)

( * ) Notice: Subject to any disclaimer, the term of this patent is extended or adjusted under 35 U.S.C. 154(b) by 766 days.

(21) Appl. No.: 09/745,230

(22) Filed: Dec. 21, 2000

(65) Prior Publication Data

US 2001/0030682 A1 Oct. 18, 2001

Related U.S. Application Data

(60) Provisional application No. 60/173,249, filed on Dec. 28, 1999.

(51) Int. Cl.$^7$ .............................................. H04N 5/225
(52) U.S. Cl. ...................................................... 348/47
(58) Field of Search ........................... 348/47, 42, 43, 348/44, 46, 48; H04N 5/225

(56) References Cited

U.S. PATENT DOCUMENTS

| | | | | |
|---|---|---|---|---|
| 3,959,580 A | * | 5/1976 | Chocol et al. ................ 348/42 |
| 4,418,993 A | * | 12/1983 | Lipton .......................... 352/57 |
| 5,142,357 A | * | 8/1992 | Lipton et al. ................. 348/48 |
| 5,644,324 A | * | 7/1997 | Maguire, Jr. .................... 345/9 |
| 5,668,595 A | * | 9/1997 | Katayama et al. ......... 348/218.1 |
| 5,742,333 A | | 4/1998 | Faris |
| 5,748,199 A | | 5/1998 | Palm |
| 5,883,695 A | * | 3/1999 | Paul ............................. 352/43 |

FOREIGN PATENT DOCUMENTS

| | | |
|---|---|---|
| DE | 19542308 | 5/1996 |
| EP | 0817493 | 7/1998 |

* cited by examiner

*Primary Examiner*—Nhon Diep

(57) ABSTRACT

A method and apparatus for providing inexpensive and accurate electrical synchronization between the individual cameras within a 3D or stereoscopic video camera is disclosed. The method and apparatus use a common clock pulse to both cameras and a frame reset pulse generated by one camera to provide a frame reset for the second camera. By using these pulses, it is possible to fully synchronize the two camera, a multiplexer and an RGB encoder to produce a totally in synchronization 3D or stereoscopic video signal without using expensive gen-lock techniques. In addition a method and apparatus for providing mechanical adjustment for the convergence of the horizontal axes of the cameras with a 3D or stereoscopic video camera is explained. It addition, the basic techniques used in the convergence is also shown for achieving an inexpensive and accurate method and apparatus for matching the tilt position of the individual cameras is shown.

1 Claim, 5 Drawing Sheets

3D CAMERA

CROSS REFERENCE TO RELATED APPLICATIONS

This application is related to provisional application No. 60/173,249 filed on Dec. 28, 1999 by Walter Tserkovnyuk and is hereby incorporated herein in full by reference.

BACKGROUND OF THE INVENTION

This invention relates to a 3D camera system, particularly to a camera with synchronized scanning and an adjustable lens/camera positioning apparatus.

Stereoscopic or three-dimensional vision may be created on a two-dimensional medium by creating a pair of stereoscopic images; a left eye image and right eye image. If a viewer sees only the left eye image with the left eye and the right eye image with the right eye, the viewer perceives a three dimensional image from the stereoscopic images. Conventional video display devices produce an image by creating a plurality of horizontal display lines interlaced in two fields within a frame.

Stereoscopic cameras have been previously described in a series of issued U.S. patent by Faris and the assignee of this application. They include: U.S. Pat. No. 5,742,333 issued on Apr. 21, 1998; U.S. Pat. No. 5,745,164 issued on Apr. 28, 1998 and U.S. Pat. No. 5,760,827 issued on Jun. 2, 1998, all hereby incorporated by reference. These patents disclose spectrally-multiplexed color images of 3D scenery produced by a camera that records left and right color perspective images and optically process the spectral components thereof.

A 3D camera requires certain mechanical adjustments to produce the most accurate and pleasing stereoscopic image at the display. These include an adjustment to converge the horizontal axes at various points in front of the camera and adjustments to arrange the tilt angle of the two cameras to be identical. The prior art required complicated mechanical arrangements to obtain the optimum settings.

There is a need for a 3D video camera that economically and easily provides stereo images that are in electrical synchronization as well in an optimum mechanical position.

BRIEF SUMMARY OF THE INVENTION

The embodiments of the invention include a method and apparatus for an economical method and apparatus for synchronizing the outputs of a left and right camera in a 3D or stereoscopic video camera and a method and apparatus for adjusting the mechanical configuration and relationship between the left and right cameras in a 3D or stereoscopic video camera.

The electrical embodiment includes a 3D or stereoscopic video camera having a first solid-state camera providing an RGB output representing a left eye presentation in a 3D or stereoscopic scene and a second solid state camera providing an RGB output representing a right eye presentation in a 3D or stereoscopic scene. A clock generator generating a clock pulse at a frequency up to four times the 3D video camera color subcarrier frequency is coupled to a clock input of each solid-state camera and a video encoder. A frame reset pulse generated by either solid state camera is coupled to a field rate pulse input of the other solid state camera. The frame reset pulses synchronizes the frame start points of the solid state cameras. An RGB output of each solid-state camera and a field ID pulse from either solid state camera are coupled to a multiplexer. The multiplexer switches the RGB output of the solid state camera representing the left eye representation during a first field of a frame to an RGB output. The multiplexer switches the RGB output of the solid state camera representing the right eye representation during a second field of a frame to the RGB output. The multiplexed RGB signal is coupled to an RGB monitor, an RGB video projection system or an external RGB encoder.

An additional embodiment of a 3D video camera of the invention further includes an RGB encoder with RGB signals coupled from an RGB output of the multiplexer and the clock pulses are coupled to a clock input of an RGB encoder. A composite sync signal is coupled from a composite sync output of either solid-state camera to the encoder to provide synchronization between the cameras and the encoder. The encoder provides a composite video, NTSC or PAL signal depending on the clock pulse frequency and settings, or an S-video output. The RGB encoder provides a composite video output or S-Video output with field one having a representation of the left eye image and field two having a representation of the right eye image or visa versa.

In addition to the electrical embodiments discussed above, the 3D video camera has two exemplary mechanical embodiments for an inexpensive method of providing lens camera axis convergence and a method of providing tilt adjustment of one of the lens/camera assemblies for accurate tilt alignment of the left and right camera with respect to each other. These embodiments require only a single adjustment for convergence and a single adjustment for the tilt alignment.

The 3D camera adjustment system includes a first camera lens and camera circuitry mounted on a first mounting surface and a second camera lens and camera circuitry mounted on a second mounting surface. Each mounting surface is mounted with a three position support structure with two of the support structures being furthest from a horizontal center of the system and a remaining support structure for each mounting surface both being at a top or bottom of said mounting surface and nearest to the horizontal center of said system.

Both mounting surfaces have a fixed outside support structure in a fixed rotational position whereas one mounting surface has a second outside support structure in an adjustable rotational position. The other mounting surface has both support structures in a fixed rotational position where the adjustable support position rotates its mounting surface and lens camera combination about a vertical axis of the other mounting surface camera lens combination.

The third support position for each mounting surface lens camera combination is coupled to a common adjustment fixture for rotating about the horizontal axis of each mounting surface camera lens combination. This common adjustment fixture includes a moveable T-bar arrangement having a rotational adjustment spring combination and the adjustment moves each camera lens combination so that their optical axes converge at selected points.

DETAILED DESCRIPTION OF THE INVENTION

A stereoscopic video camera needs to have the individual cameras representing the left eye image and the right eye image to be synchronized mechanically and electrically to produce the most realistic stereoscopic effect. As is well known in the art, for standard stereoscopic recording a stereoscopic camera needs two pick-up devices with their horizontal center axes approximately equal to the eye separation of a human being, with an exemplary value of 2.5 inches. The electrical synchronization is required to produce two signals in phase with respect horizontal and vertical synchronization and chroma frequency.

Figure 1:
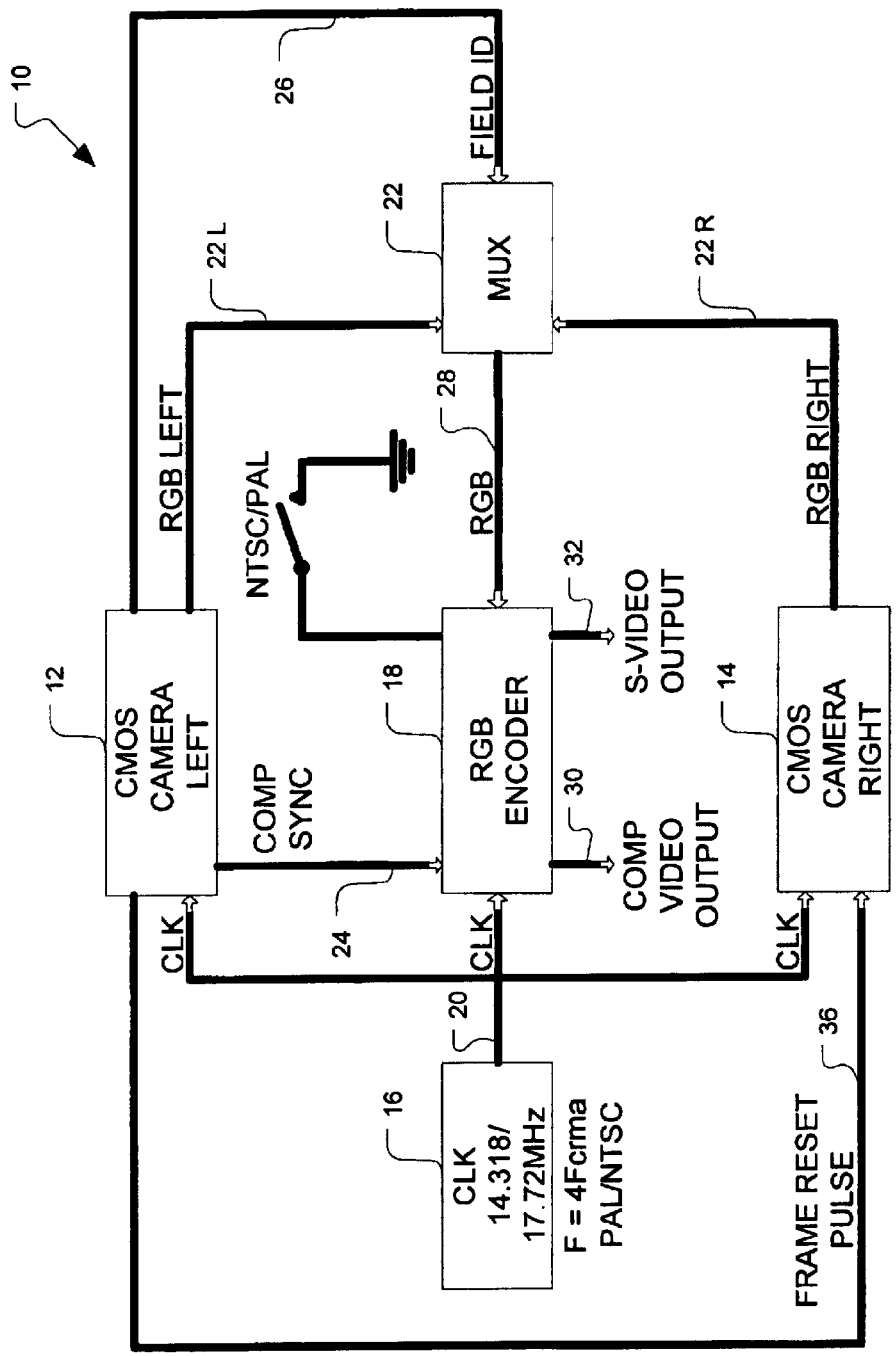
FIG. 1 illustrates an electrical block diagram of a 3D video camera.

FIG. 1 illustrates a block diagram of an exemplary embodiment of a 3D video camera 10. As is well known in the art, a 3D or stereoscopic camera requires two photosensitive elements to produce the stereoscopic effect. For a 3D video camera, this requires two separate video cameras that are electrically and physically synchronized. In FIG. 1, Camera Left 12 and Camera Right 14 are physically mounted to maximize the stereoscopic effect as will be discussed below. A Clock 16 generates a Clock Signal 20 equal to an exemplary value of four times the subcarrier frequency of the Encoder 18. If the camera is designed for NTSC 525 lines/30 frames, the clock frequency is equal to 14.318 Mhz. If the camera is designed for PAL 625 lines/25 frames, the clock frequency is equal to 17.72 Mhz.

The individual cameras in the exemplary embodiment are model OV7910 "Single-Chip Color NTSC/PAL Camera" (CMOS) produced by OmniVision Technologies, Inc., Sunnyvale, Calif. A brochure for this semiconductor camera dated Jun. 17, 1999 is hereby incorporated by reference. The CMOS Camera is a complete camera, producing an RGB output at the 525/60 scanning rate or the 625/50 rate depending upon the frequency of the Clock Signal 20. Each CMOS Camera's RGB outputs 22L and 22R are connected to an input of a multiplexer (MUX) 22. Either camera may provide a composite sync (COMP SYNC) output 24 to an RGB encoder (ENCODER) 18. In the exemplary embodiment of FIG. 1, the COMP SYNC 24 output is coupled from the CAMERA LEFT. Either camera may be the source of the composite sync output. The camera system is not limited to the use of semiconductor cameras or this particular model of semiconductor camera.

As discussed above, the CMOS Cameras (CAMERA LEFT 12 or CAMERA RIGHT 14) are complete video cameras producing RGB outputs in 525/60 or 625/50 systems. They include the sensor, the video amplification required including selectable gamma correction, gain control (up to 18 db.) and automatic white balance (for color correction).

Each camera produces a Frame Reset Pulse representing the beginning of each frame of the output signal. In addition each camera has a field sync input for synchronizing the beginning of each field. In the exemplary embodiment illustrated in FIG. 1, CAMERA LEFT 12 is providing a FRAME RESET PULSE 24 to the field sync input for CAMERA RIGHT 14. Since each camera is receiving a common clock frequency and a second camera is receiving a pulse representative of the beginning of a frame from a first camera, the two cameras are fully synchronized electrically.

The RGB outputs of these two fully synchronized video cameras are coupled to their respective inputs of MUX 22. One of the cameras provides a FIELD ID pulse 26 to the switching input of the MUX 26. The switching rate is at the field rate such that the output of CAMERA LEFT 12 is connected to RGB ENCODER 18 during field one of every frame. CAMERA RIGHT 14 is connected to RGB ENCODER 18 during field two of every frame. The connections may also be the reverse of that listed here. That is the left camera may be connected to field two and the right camera connected to field one.

As is well known in the art, an RGB encoder such as RGB ENCODER 18 encodes the RGB input into a composite video output COMP VIDEO OUT 30 or an S-VIDEO OUT 32. As discussed above, the encoder RGB ENCODER 18 receives a CLK 20 and COMP SYNC 24 to provide the synchronizing pulses and color subcarrier for the composite output and S-Video output of the encoder. The encoder used in the exemplary embodiment described above is an AD724—RGB to NTSC/PAL Encoder produced by Analog Devices of Norwood, Mass. and is described in a 1999 brochure available from Analog Devices. The brochure is hereby incorporated by reference. The composite or S-Video output of the encoder is coupled to the input of a display device such as a color monitor or large screen video projection system. The composite or S-video output may also be coupled to a video recorder for recording of the 3D or stereoscopic image.

Another embodiment of the 3D camera system has the RGB output of the multiplexer discussed above coupled directly to the RGB inputs of a display device such as an RGB monitor or RGB inputs of the large screen projection system. In addition, the COMP SYNC signal 24 is coupled to the video display device. The advantages of the RGB display system are well known and include a higher resolution display. The advantage of the embodiment described above includes a synchronized output from two cameras coupled to an encoder or directly to a display device without an expensive gen-lock system.

The method of synchronizing two cameras in a 3D camera system may be used in non-3D systems as well as where multiple cameras need to be synchronized without using an expensive gen-lock system. In such an embodiment a plurality of cameras would each have a common clock pulse coupled to a clock input and the frame reset pulse out of one of the cameras coupled to the remaining cameras. The individual RGB camera may then be coupled to a display or recording device via a switcher switching the RGB outputs into the display device. An alternative is to have each camera have an RGB encoder connected to the RGB outputs of the camera and a clock pulse. This embodiment may be used to synchronize multiple cameras in a non-3D system or to synchronize multiple 3D cameras.

In addition to being in synchronization electrically, a 3D camera has certain physical characteristics needed for an effective stereoscopic display. The first is to adjust the convergence of the axes of the two lenses matches with the desired placement of the image within the display. The second is to insure that the two camera lenses are aimed in the same direction relative the horizontal plane.

In stereoscopic display technology, an object at the convergence point of the lens/camera axes will appear at the plane of the display device. An object in front of the convergence point will appear in front of the display device and an object behind the convergence point will appear behind the plane of the display device. Therefore it is desirable to adjust the convergence of the axis of the two cameras to place the viewed object at a visually appealing location.

Figure 2:
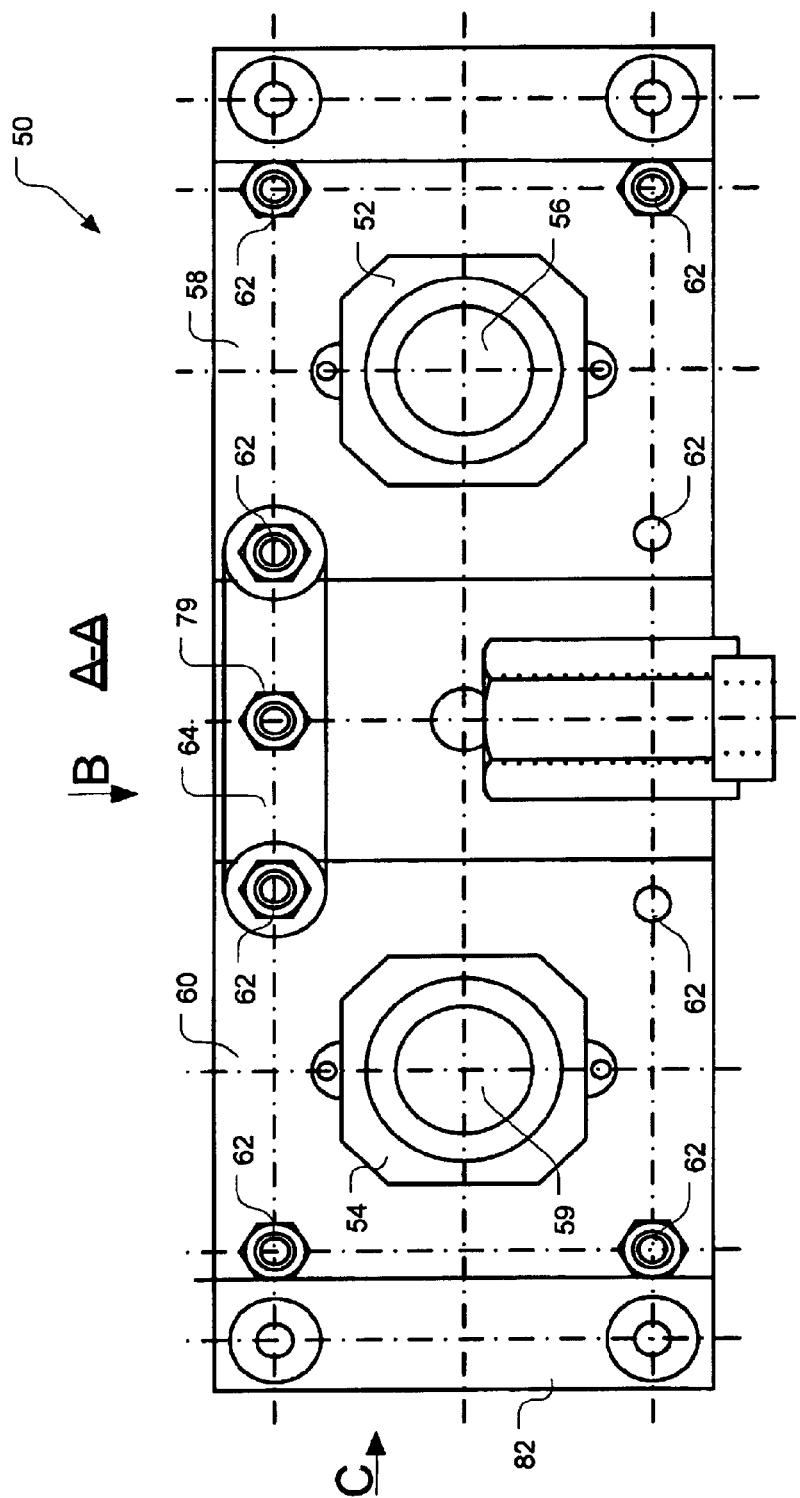
FIG. 2 illustrates an assembly drawing illustrating a front view of the adjustment mechanism used in a 3D video camera.

FIG. 2 illustrates a front view of a 3D video camera 50 having the physical embodiments of the invention. Each single chip camera described above 52 and 54 with its lens 56 and 59 is mounted on a printed circuit assembly 58 and 60. The camera representing the left eye view 52 and 56 is mounted on a printed circuit board 58 on the right side of the camera system 50 and the camera representing the right eye view 54 and 58 is mounted on a printed circuit board 60 on the left side of the camera system 50. Each printed circuit board 58 and 60 has four mounting holes 62. Three of the four mounting holes on each printed circuit board are used.

Figure 3:
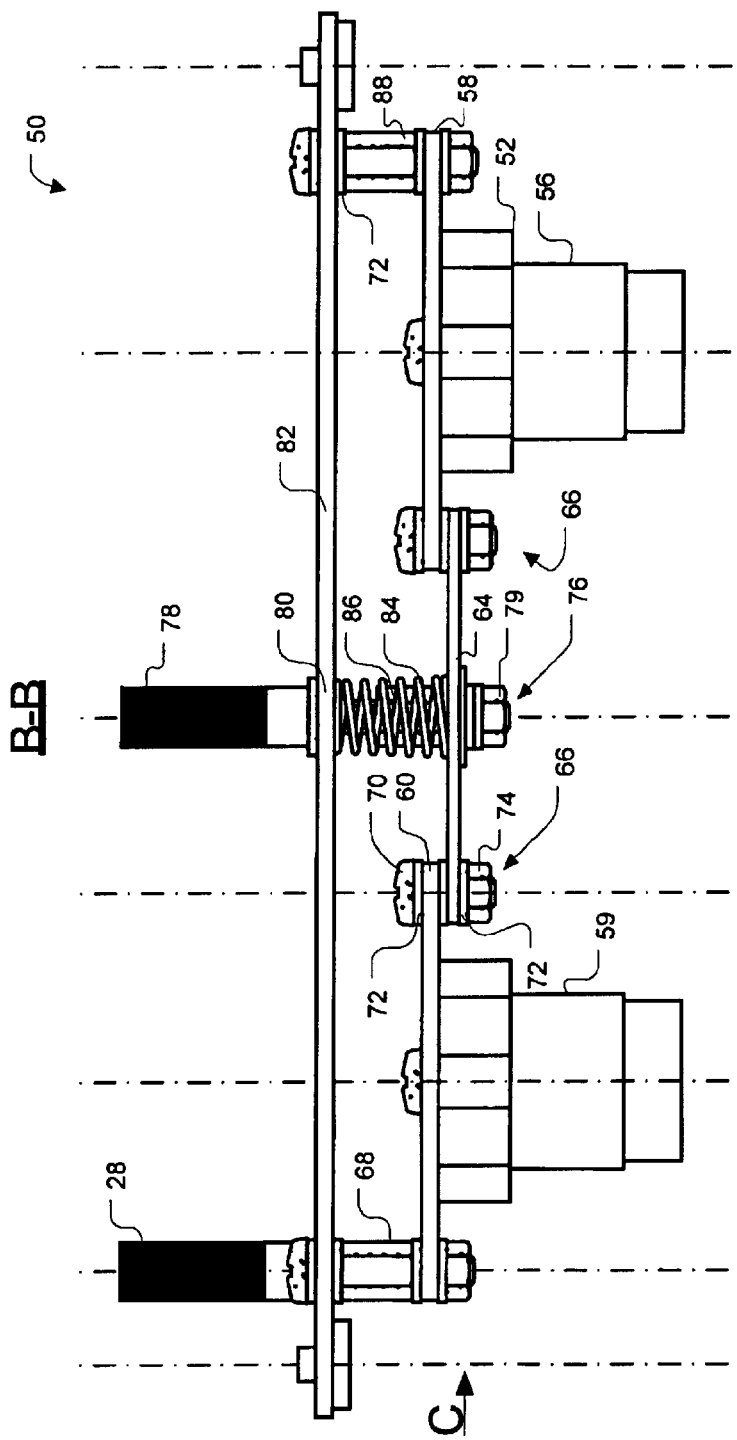
FIG. 3 illustrates an assembly drawing illustrating a top view of the adjustment mechanism used in a 3D video camera.
Figure 4:
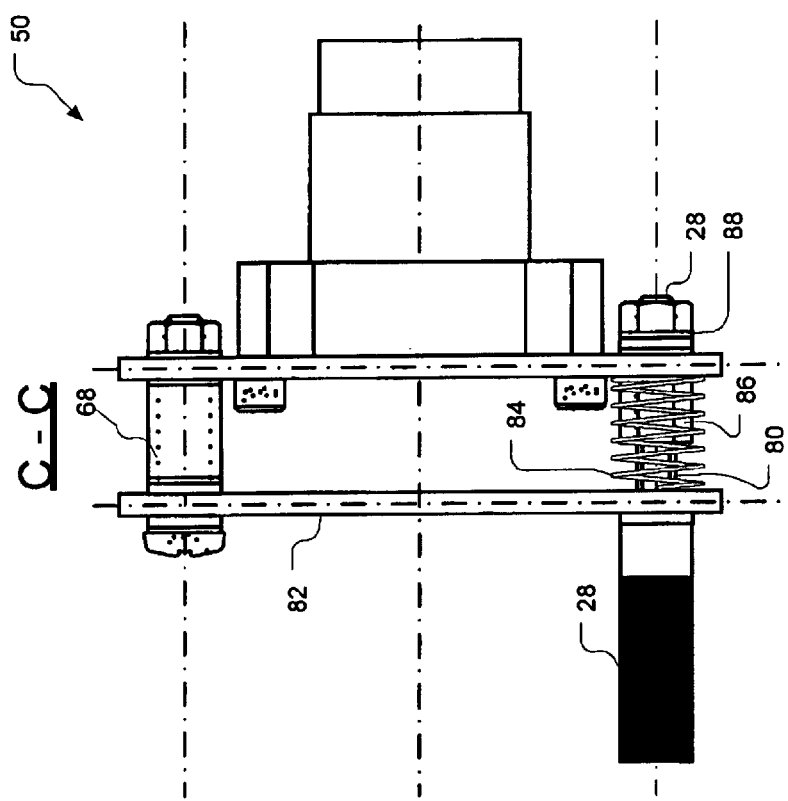
FIG. 4 illustrates an assembly drawing illustrating a side view of the adjustment mechanism used in a 3D video camera.
Figure 5:
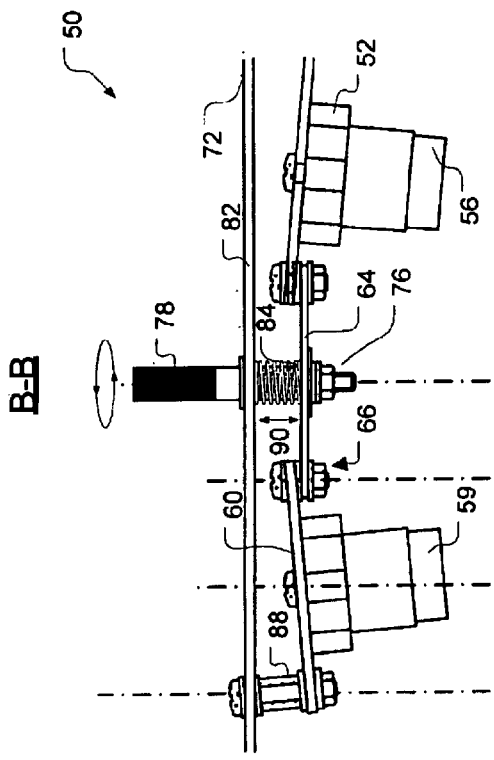
FIG. 5 illustrates details of a camera adjustment mechanism for maintaining a common horizontal position between cameras.

As can be seen in FIG. 3 which illustrates the camera system 50 from a top view B and in FIG. 4 which illustrates the camera system 50 from a side view C. Printed circuit boards 58 and 60 have various mounting mechanisms connected to the mounting holes 62. The upper left mounting hole of the left camera printed circuit board 58 and the upper right mounting hole of the right camera printed circuit board 60 are each connected to a subassembly 66. The subassembly 66 includes a screw 70 with a rubber washer 72 on either side of lens/camera convergence adjusting bar 64 and a nut 76 as illustrated in FIG. 5. The lens/camera convergence coupling bar 64 is connected, at its center point 78 to a lens/camera convergence adjustment assembly 76, as shown in FIGS. 1 4 and 5.

The lens/camera convergence adjustment assembly has a screw with a knurled knob screw 78 with a screw portion that passes through a hole 80 within camera system circuit board 82, then through a spring 84. The screw portion of knurled screw 78 passes through a washer, the washer being mounted to lens/camera convergence bar 64. After passing through the lens/camera convergence bar 62 the screw fastens to a nut 79. The washer 86 is sized and positioned so that the range of adjustment by the lens/camera convergence adjustment assembly is limited to be less than the distance between the lens/camera convergence bar 64 and the system circuit board 82.

The upper right hole 62 and the lower right hole 62 of the left camera printed circuit board 58 are fixed to a fixed mounting assembly 66. This assembly is similar to the assembly described above having screw 70, rubbers washers 72 and nut 74. However in this assembly there is a washer/spacer 88 to create the spatial distance between camera circuit board 58 and camera system circuit board 62, as shown in FIGS. 1 and 5. The rubber washers 66 in these assemblies perform the same function as washers 66 and 72 shown in FIG. 5. The upper left portion of the right camera printed circuit board 58 has an assembly identical to that located in the upper right and lower right of the left camera printed board 60. The lower left hole of the right camera circuit board has a mounting assembly that while different from the upper left assembly, performs a similar role as the upper left assembly for the purposes of camera/lens convergence.

FIG. 5 illustrates the performance of the lens/camera convergence system. Adjustment of knurled knob screw 78 causes the distance between the lens/camera convergence bar 64 and the system circuit board 82 to change. This movement causes the left hand portion of the left hand lens/camera 52 and 56 to move relative to the right hand portion of the left hand lens/camera 52 and 56. This occurs because the right hand mounting assemblies are fixed while the left hand mounting assembly is moving.

The right camera printed circuit board operates in a similar fashion. Adjustment of knurled knob screw 78 causes the distance between the lens/camera convergence bar 64 and the system circuit board 82 to change. This movement causes the right hand portion of the right hand lens/camera 54 and 58 to move relative to the left hand portion of the right hand lens/camera 54 and 58. This occurs because the left hand mounting assemblies are fixed while the right hand mounting assembly is moving.

As can be seen from FIG. 5, the adjustment of the lens/convergence screw 78 causes the axis of the individual cameras be adjusted from no convergence (convergence point be at infinity) when both cameras are at a position normal to the system printed circuit board 82 to a convergence point bar near the camera when the spring 80 has been compressed such that the system circuit board 82 and the lens/convergence bar 64 are touching opposite sides of washer 86. An exemplary value of maximum convergence angle α 92 is equal to 3o. Such a convergence angle creates a cross over of the axes at approximately 24 inches from the 3D camera 50.

Figure 6:
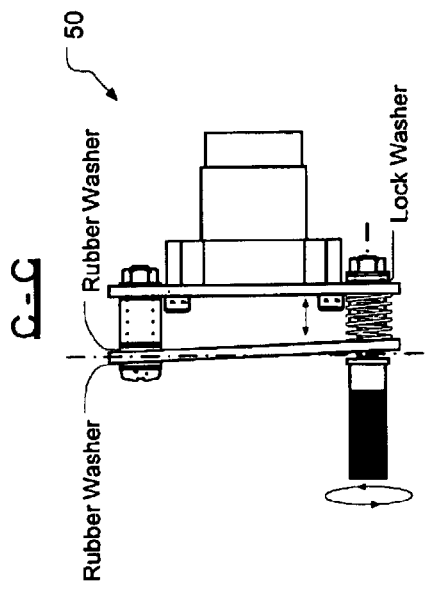
FIG. 6 illustrates details of a camera adjustment for maintaining a visually acceptable 3D display.

As discussed above, correct 3D or stereoscopic display also requires that the two cameras be in identical horizontal planes. The left lens/camera assembly 52 and 56 are fixed in tilt position tilt of lens/camera assembly relative to the camera system circuit board 62. However, the right camera lens assembly 54 and 58 has an adjustment assembly as shown in FIG. 6. the assembly is configured in a similar fashion to the lens convergence assemblies described above. This assembly is mounted in conjunction with the lower left hole of the right camera printed circuit board 60. Since the top two holes in the right camera have fixed assemblies, an adjustable assembly in the bottom left portion adjusts the tilt of the right camera such that the right camera may tilt such that the vertical position of its lens/camera axis may be above or below the lens/camera axis of the left lens/camera 52 and 56. This adjustment permits the operator to adjust the tilt of the right image so the two images are in vertical spatial synchronization.

The adjustments described above provide a simple two-adjustment method of creating the optimal stereoscopic display with a minimum of adjustment by the operator. This provides for economy of purchase price as well as economy of time in the use of the 3D camera system.

The two embodiments, the electrical system and the mechanical system, described herein allows for a simple to use and operate 3D video camera. The 3D camera produces a stereoscopic television signal that may be transmitted and/or recorded in normal video channels that includes broadcast, cable as well as Internet streaming applications. The 3D camera signal may also be recorded on a recording medium for replay at a later date.

The display of such a camera image may be on a video monitor or projection system. The viewer must wear glasses that operate in synchronization with the switching of the left image and the right image on a field basis. Such glasses are described in: U.S. Pat. No. 5,828,427 issued on Oct. 27, 1998 to Faris; U.S. Pat. No. 5,680,233 issued on Oct. 21, 1997 to Faris et.al; and U.S. Pat. No. 6,002,518 issued on Dec. 14, 1999 to Faris. The U.S. patents are hereby incorporated by reference.

The various embodiments of the present invention will be useful in many diverse stereoscopic imaging applications. However, it is understood that various modifications to the illustrative embodiments of the present invention will readily occur to persons with ordinary skill in the art. All such modifications and variations are deemed to be within the scope and spirit of the present invention as defined by the claims appended hereto.

What is claimed is:

1. A 3D camera adjustment system comprising:

a first camera lens and camera circuitry mounted on a first mounting surface;

a second camera lens and camera circuitry mounted on a second mounting surface;

each mounting surface mounted with a three position support structure with two of said support structures being furthest from a horizontal center of the system and a remaining support structure for each mounting surface being both at a top or bottom of said mounting surfaces and nearest to the horizontal center of said system;

both mounting surfaces having a fixed outside support structure in a fixed rotational position wherein one mounting surface has an adjustable outside support structure in an adjustable rotational position and the other mounting surface has both support structures in a fixed rotational position wherein said adjustable support structure rotates its mounting surface and lens camera combination about a vertical axis of the other mounting surface camera lens combination;

said third support position for each mounting surface lens camera coupled to a common adjustment fixture for rotating about a vertical axis of each mounting surface camera lens combination wherein said common adjustment fixture further comprises a moveable T-bar arrangement having a rotational adjustment spring combination and further wherein said adjustment moves each camera lens combination so that their optical axes converge at selected points.

* * * * *